United States Patent
Lam et al.

(10) Patent No.: US 10,737,448 B2
(45) Date of Patent: Aug. 11, 2020

(54) SEALANT FOR TIRE REPAIRING

(71) Applicant: TOP ALLIANCE TECHNOLOGY LTD., Tortola, VI (US)

(72) Inventors: Koon Fung Lam, Tuen Mun (CN); Tsz Nok Ng, Kowloon (CN); Wai Kwong Ching, N.T. (CN); Ping Shu Ho, Fanling (CN)

(73) Assignee: TOP ALLIANCE TECHNOLOGY LTD., Tortola, VI (US)

( * ) Notice: Subject to any disclaimer, the term of this patent is extended or adjusted under 35 U.S.C. 154(b) by 159 days.

(21) Appl. No.: 15/771,421

(22) PCT Filed: Oct. 27, 2015

(86) PCT No.: PCT/CN2015/092938
§ 371 (c)(1),
(2) Date: Apr. 27, 2018

(87) PCT Pub. No.: WO2017/070837
PCT Pub. Date: May 4, 2017

(65) Prior Publication Data
US 2018/0333926 A1    Nov. 22, 2018

(51) Int. Cl.
| B29C 73/18 | (2006.01) |
| C09J 107/02 | (2006.01) |
| B29C 73/16 | (2006.01) |
| C09J 121/02 | (2006.01) |
| C09J 11/06 | (2006.01) |

(52) U.S. Cl.
CPC ............. B29C 73/163 (2013.01); C09J 11/06 (2013.01); C09J 107/02 (2013.01); C09J 121/02 (2013.01)

(58) Field of Classification Search
CPC .................................................. B29C 73/163
See application file for complete search history.

(56) References Cited

U.S. PATENT DOCUMENTS

| 4,501,825 A | 2/1985 | Magyar et al. |
| 6,344,499 B1 | 2/2002 | Kawamura et al. |
| 6,605,654 B1 * | 8/2003 | Fang ..................... B29C 73/166 523/166 |
| 6,992,119 B2 | 1/2006 | Kojima et al. |
| 8,772,370 B1 * | 7/2014 | Sulemanji ............. B29C 73/163 523/166 |
| 2013/0072594 A1 | 3/2013 | Okamatsu et al. |
| 2014/0221535 A1 | 8/2014 | Chan et al. |

FOREIGN PATENT DOCUMENTS

| CN | 104725885 A | 6/2015 |
| EP | 1836249 A2 | 9/2007 |
| JP | 2011-012159 A | 1/2011 |
| WO | WO-2006/002039 A2 | 1/2006 |

OTHER PUBLICATIONS

International Application No. PCT/CN2015/092938, International Search Report and Written Opinion, dated Jun. 21, 2016.
International Application No. PCT/CN2015/092938, International Preliminary Report on Patentability (Chapter II), dated Aug. 21, 2017.
Japanese Patent Application No. 2018-521909, Search Report, dated Jul. 25, 2019.
Japanese Patent Application No. 2018-521909, Notice of Reasons for Refusal, dated Aug. 6, 2019.
European Patent Application No. 15906903.8, Extended European Search Report, dated May 28, 2019.

* cited by examiner

Primary Examiner — Kara B Boyle
(74) Attorney, Agent, or Firm — Marshall, Gerstein & Borun LLP

(57) ABSTRACT

Subject matter disclosed herein relates to sealant for tire repairing and more particularly, relates to sealant composition for repairing tire punctures and a method of preparing the same.

10 Claims, No Drawings

SEALANT FOR TIRE REPAIRING

TECHNICAL FIELD

The present application relates to the field of tire sealant, and more particularly, relates to sealant composition for repairing tire punctures and a method of preparing the same.

BACKGROUND ART

Tire sealant had been used in tires for sealing punctured tire. There are two types of tire sealant that function under different occasions. The common one is usually injected to pneumatic tires after puncture is discovered. Normally, the sealant is injected to the tire through the valve stem by pressurized air. As sealant passes puncture holes, it blocks the holes and stops gas leakage. A sufficiently large volume of sealant is required. It is usually preformed as an emergency solution for tire puncture because the sealant degrades gradually.

Preventative sealant is another type of tire sealant. It is placed inside the tire before occasion of puncture and served as a precaution. When tire puncture occurs, the sealant, which keeps circulating inside the tire, passes and seals the puncture.

In either cases, it is unavoidable that a large amount of sealant is required resulting in an increase of vehicle loading and a reduction of capacity of vehicle. This is undesirable in current market which emphasizes environmental friendly and cost effective products. Therefore, sealant of high sealing performance with small volume is demanding.

Foam sealant capable in expansion in volume is an alternative. An example of this type of sealant is disclosed in U.S. Pat. No. US 2013/0072594 A1. It discloses a sealant formula comprised of reactive blowing agent. It demonstrates an expansion of sealant due to chemical reaction. Isocyanate group in one of the suggested blowing agents is toxic, and its median lethal dose (LD50) is 5,000 mg/kg. Another recommended blowing agent (carboxy groups and hydrogencarbonate salt) generates carbon dioxide during foaming. However, the tire sealant may be stored in car baggage compartment, which can be very hot, so this may induce thermal decomposition of hydrogencarbonate that releases $CO_2$. This may result in the leakage of sealant or explosion of sealant container. Hence expansion of sealant shall not rely on chemical reaction. In addition, consumers may scare of a sealant comprising reactive chemical.

CITATION LIST

Patent Literature 1: US 20130072594 A1
Patent Literature 2: US 20140221535 A1
Patent Literature 3: WO 2006002039

SUMMARY OF INVENTION

Technical Problems

Sharp and/or hard matters, such as rocks, glass and ice, on the road can result in tire puncture of a travelling vehicle. One of the consequences may be a traffic accident that causes casualties.

A timely detection of tire puncture and tire repairing can avoid such accident. However, tire repairing commonly takes a long time and has to be operated on the road side. This generates another safety issue, especially at extreme condition, e.g. bad weather.

The known sealants in the art may have solved part of the above identified problems, but they need relevantly more volume such that their weight is heavier and are difficult-to-handle.

Solution to Problems

Therefore, it is an object for the present invention to provide a tire sealant which can effectively reduce the risk of tire repairing on the road and has the advantages with respect to faster sealing performance, light-weight and easy handling of tire sealant.

In particular, the present invention aims to make improvement of these aspects. The present invention can achieve the reduction of sealant volume. Hence, foam sealant, which expands when injecting to the tire, effectively surpass the traditional tire sealant. In specific, the expansion is not made by chemical means or is not caused by chemical reaction.

Currently, tire sealants available in the market contain various components. Typically, the formula consists of solvent, tackifier, emulsifier, antifreezing agent and additives.

<Solvent/Water>

Solvent can be any liquid that embed all the components and mainly served as a medium for carrying the components. The solvents can be organic, water and mixture of both.

The organic solvent can be any solvent that dissolve and/or suspend the components in the sealant. The organic solvents include but not limited to ethanol, propan-1-ol, propan-2-ol, butan-1-ol, butan-2-ol, butan-3-ol, ethyl acetate, acetone and methyl ethyl ketone. The solvent/water content can be in the range of 20 to 80 wt % of total sealant.

<Tackifier>

Tire sealant blocks the puncture by filling and solidification. The tackifier plays a key role in determining the sealing performance. Latex, including synthetic and nature latex, is commonly used as tackifier. Natural rubber latexes include but not limited to latex sourced from Hevea brasiliensis, deproteinized natural rubber latex, which is produced by removing proteins from a natural rubber latex.

The content of latex is commonly between 20 and 60 wt % of total sealant. For instance, patent U.S. Pat. No. 6,344,499 B1 and U.S. Pat. No. 6,992,119 B2 discloses sealants comprising 55-60 wt % deproteinized natural latex and 30-60 wt % natural latex.

<Anti-Freezing Agent>

Under low temperature, liquid sealant can be converted to solid (freezing) completely or partially, or the liquid sealant becomes very viscous.

Conversion of the liquid sealant to solid partially or completely or the high viscosity of the liquid sealant may cause a large pressure drop when the liquid sealant is injected to the tire. In an extreme case, clogging of the flowing path (including but not limited to container nozzle, tire nozzle, valve) could cause failure in tire sealant injection and affect sealing performance.

Antifreezing agent is normally added to the sealant to enhance its resistance to freezing under low temperature. It can effectively reduce the viscosity of sealant at low temperature and/or prevent the solidification of sealant due to freezing.

Antifreezing agent can be substance including but not limited to propylene glycol, ethylene glycol, glycerin, methanol, ethanol, propan-1-ol and propan-2-ol.

<Surfactant/Additional Foaming Agent>

The sealant contains surfactant that served for a certain functions.

One of the functions is to stabilize the latex, at various conditions including but not limited to high temperature and low temperature storage, under vibration, shaking or high stress during pumping the sealant through a nozzle or hose.

Another function of surfactant is to foam the sealant when mixing vigorously with gas.

Mixing between sealant and gas can be achieved by any means. These include but not limited to bubbling, stirring and/or spraying.

Another function of surfactant is to encapsulate the component(s) in the sealant.

The encapsulated component(s) can be any material inside the sealant.

The surfactant can be anionic, amphoteric or a combination of them.

The surfactant can be amphodiacetate surfactant which includes but not limited to cocoamphodiacetate, Lauryl amphodiacetate, etc.

The surfactant can be amphoacetate surfactant which includes but not limited to cocoamphoacetate, Lauryl amphoacetate.

The surfactant can be amide oxide surfactants which include but not limited to lauramine oxide, cocamine oxide.

Foaming agent in addition to the surfactant can be used in foaming (gas/liquid emulation creation), stabilizing the foams or both.

The foaming mechanism according to the present invention is based on the stabilization of liquid-gas interface that is determined by the thermodynamic properties of liquid mixture composition (including particles), gas and surfactant.

Chemical reaction (which is defined as production of new component and/or consumption of certain composition) is not the main foaming route in sealant according to the present invention.

<Additives>

In addition to the components mentioned above, the sealant may contain additive such as anti-aging agent, bactericide, plasticizer, flame retardant, dehydrating and anti-static agent.

The additive may be added to sealant not particularly for sealing and/or foaming enhancement.

The additive may be added to alternate other physical properties including but not limited to odor, color texture, viscosity, etc.

EMBODIMENTS

According to an embodiment of the present invention, the present invention includes a tire puncture sealant repairing with aid of foaming, which comprises a rubber latex, an anti-freezing agent, a surfactant and solid particles; wherein the sealant has an expansion ratio of above 200% measured by a blender test according to ASTM D3519-88 and/or comprises surfactant having acetate group or amine oxide group.

The tire puncture sealant according to any one of the preceding embodiment, wherein the foaming is a condition that the tire puncture sealant expands by gas introduction during injection of sealant.

The tire puncture sealant according to any one of the preceding embodiments, wherein the gas comprises any substance presented in gas phase with a density of 0.179-1.2 kg m$^{-3}$ under normal condition.

The tire puncture sealant according to any one of the preceding embodiments, wherein the injection of sealant comprises a process of placing the tire puncture sealant into a tire by any means with aid of gas flow.

The tire puncture sealant according to any one of the preceding embodiments, wherein the rubber latex comprises a natural rubber latex and/or a deproteinized natural rubber latex.

The tire puncture sealant according to any one of the preceding embodiments, wherein the anti-freezing agent comprises at least one selected from the group consisting of an ethylene glycol, a propylene glycol, a 1,3-propanediol, a glycerin and mixtures thereof.

The tire puncture sealant according to any one of the preceding embodiments, wherein the surfactant comprises an amphoteric surfactant.

The tire puncture sealant according to any one of the preceding embodiments, wherein the amphoteric surfactant comprises an amine oxide and/or an amphoacetate and/or an amphodiacetate.

The tire puncture sealant according to any one of the preceding embodiments, wherein the solid particles comprises a mixture of solid particles with one or more hydrophobicity and have any shape.

The tire puncture sealant according to any one of the preceding embodiments, which has an expansion ratio above 200% measured by a blender test at a temperature −30° C.

The tire puncture sealant according to any one of the preceding embodiments comprising a rubber latex, an anti-freezing agent, solid particles and the surfactant having acetate group or amine oxide group comprises a zwitterionic surfactant of formula (I) or (II) or (III) shown below:

$$\text{R—C(=O)—NH—(CH}_2\text{)}_x\text{—N}\genfrac{}{}{0pt}{}{\text{(CH}_2\text{CH}_2\text{—O—A)}_a}{\text{(CH}_2\text{CH}_2\text{—OH)}_b} \quad \text{formula (I)}$$

where A is an acetate group:

$$\text{—CH}_2\text{—C(=O)—O}^-\text{M}^+$$

M is monometallic ion, RCO=$C_6$-$C_{24}$ acyl or mixtures thereof, x is 0-4, a is 0-1 and b is 0-1, wherein a+b=1.

$$\text{R—N}^+(\text{CH}_3)(\text{CH}_3)\text{—O}^- \quad \text{formula (II)}$$

where R is $C_6$-$C_{24}$ alkyl or mixtures thereof.

$$\text{R—C(=O)—NH—(CH}_2\text{)}_x\text{—N}^+(\text{CH}_3)(\text{CH}_3)\text{—O}^- \quad \text{formula (III)}$$

where R is $C_6$-$C_{24}$ acyl or mixtures thereof and x is 0-4.

The tire puncture sealant according to any one of the preceding embodiments, wherein the surfactant comprises at least one selected from the group consisting of non-ionic surfactant, anionic surfactant, cationic surfactant.

EXAMPLES

The present invention is illustrated in reference to the following examples.

<Preparation of Sealant>

The sealant according to the present invention is prepared by mixing two parts together.

The first part, part A, contains water/solvent, antifreezing agents, foaming agent, surfactant, additive, emulsifier.

The second part, part B, contains water/solvent and tackifier (latex).

In typical preparation, Part A is added to Part B. The pH of the final composition is adjusted to above 8.5 by addition of alkaline including but not limited to NaOH, KOH, ammonia, tetramethylammonium hydroxide.

<Evaluation>

Foam sealant is tested for two properties, (1) foaming property and (2) sealant performance, and the test results of the Examples according to the present invention are provided in the following Table 1.

<Foaming Properties>

Foaming properties are evaluated by the volume expansion of the sealant after bubbling with gas under −30° C.

For the foaming properties, the expansion factor, $\alpha$, is defined as the ratio of final sealant volume to initial sealant volume. The final sealant volume comprises of the original sealant and gas embed inside, whereas initial sealant volume comprises of only the volume of liquid partition.

$$\alpha = \frac{\text{final sealant volume}}{\text{initial sealant volume}}$$

Gas can also be injected to the sealant by different means including but not limited to bubbling, agitation, spraying, and bubbling under agitation Foaming properties are also evaluated by ASTM D3519-88.

The test was conducted at 8000 rpm±50 rpm with 250 ml container.

The expansion ratio is denoted as $\beta$ $$\beta = \frac{\text{Maximum Height of Foam at zero time}}{\text{Initial Height of Sealant}}$$

<Sealing Properties>

The sealing properties are determined by the ability on sealing tire having puncture.

In a typical test, certain volume of sealant was injected to a completely deflated tire installed on a vehicle.

Inflation is completed after sealant has been placed inside the tire.

The vehicle is allowed to travel for certain distance and/or static for certain time.

The sealant is defined as good when pressure maintained in the tire can support for typical operation.

In an embodiment of the present invention, the viscosity value of the sealant is in a range below 346 mPa·s In an embodiment of the present invention, the pH value of the sealant composition is from 8.5 to 11 (under room condition) and preferably in a range of 9-10.

The sealant composition according to the present invention has insignificant settling within 24 hours. The use of rigid particles having low density such as air balloon may prevent the settling problem.

In order to make the technical features, the purpose and the technical effect of the present applications more clear, the present application will now be described in detail with reference to the accompanying examples.

Seventeen Examples of sealant composition are shown as follows.

Example 1

The sealant composition comprised 48.39 wt % antifreezing agent (propylene glycol), 20 wt % natural latex, 0.5 wt % amphoteric surfactant (Dodecyl dimethyl betaine, DDMB), 0.1 wt % anionic surfactant (tetraethyl ammonium), 0.2 wt % solid particles and balanced water. The pH of the sealant is 10.

Example 2

The sealant composition comprised 48.39 wt % antifreezing agent (propylene glycol), 10 wt % natural latex, 0.5 wt % amphoteric surfactant (Dodecyl dimethyl betaine, DDMB) and 0.1 wt % anionic surfactant (sodium dodecyl sulfate), 0.5 wt % solid particles and balanced water. The pH of the sealant is 10.

Example 3

The sealant composition comprised 48 wt % antifreezing agent (propylene glycol), 10 wt % nature latex, 0.8 wt % nonionic surfactant (Tween-60), 2 wt % amphoteric surfactant (disodium cocoamphodiacetate (CAD-40)), 0.9 wt % solid particles, 2.5 wt % organic solvent and balanced water. The pH of the sealant is 10.

Example 4

The sealant composition comprised 48 wt % antifreezing agent (propylene glycol), 19 wt % nature latex, 0.8 wt % nonionic surfactant (Tween-60), 2 wt % amphoteric surfactant (disodium cocoamphodiacetate (CAD-40)), 0.9 wt % solid particles and balanced water. The pH of the sealant is 10.

Example 5

The sealant composition comprised 48 wt % antifreezing agent (propylene glycol), 19 wt % nature latex, 1.3 wt % nonionic surfactant (Tween-60), 2 wt % amphoteric surfactant (disodium cocoamphodiacetate (CAD-40)), 0.9 wt % solid particles and balanced water. The pH of the sealant is 10.

Example 6

The sealant composition comprised 48 wt % antifreezing agent (propylene glycol), 19 wt % nature latex, 0.88 wt % nonionic surfactant (Tween-60), 2 wt % amphoteric surfactant (disodium cocoamphodiacetate (CAD-40)), 0.9 wt % solid particles and balanced water/solvent. The pH of the sealant is 10.

Example 7

The sealant composition comprised 48 wt % antifreezing agent (propylene glycol), 19 wt % nature latex, 1.07 wt % nonionic surfactant (Tween-60), 2 wt % amphoteric surfactant (disodium cocoamphodiacetate (CAD-40)), 0.9 wt % solid particles and balanced water/solvent. The pH of the sealant is 10.

Example 8

The sealant composition comprised 48 wt % antifreezing agent (propylene glycol), 19 wt % nature latex, 0.8 wt % nonionic surfactant (Tween-60), 2 wt % amphoteric surfactant (disodium cocoamphodiacetate (CAD-40)), 0.1 wt % anionic surfactant, 0.9 wt % solid particles and balanced water. The pH of the sealant is 10.

Example 9

The sealant composition comprised 48 wt % antifreezing agent (propylene glycol), 19 wt % nature latex, 0.8 wt % nonionic surfactant (Tween-60), 2 wt % amphoteric surfactant (disodium cocoamphodiacetate (CAD-40)), 0.6 wt % solid particles and balanced water.

Example 10

The sealant composition comprised 48 wt % antifreezing agent (propylene glycol), 19 wt % nature latex, 0.8 wt % nonionic surfactant (Tween-60), 2 wt % amphoteric surfactant (disodium cocoamphodiacetate (CAD-40)), and balanced water.

Example 11

The sealant composition comprised 48 wt % antifreezing agent (propylene glycol), 19 wt % nature latex, 0.8 wt % nonionic surfactant (Tween-60), 2 wt % amphoteric surfactant (disodium cocoamphodiacetate (CAD-40)), 2.5 wt % organic solvent and balanced water.

Example 12

The sealant composition comprised 48 wt % antifreezing agent (propylene glycol), 19 wt % nature latex, 0.8 wt % nonionic surfactant (Tween-60), 0.4 wt % amphoteric (disodium cocoamphodiacetate (CAD-40)), 0.9 wt % solid particles, and balanced water.

Example 13

The sealant composition comprised 48 wt % antifreezing agent (propylene glycol), 19 wt % nature latex, 2 wt % amphoteric surfactant (disodium cocoamphodiacetate (CAD-40)), 0.9 wt % solid particles, and balanced water.

Example 14

The sealant composition comprised 48 wt % antifreezing agent (propylene glycol), 19 wt % nature latex, 0.8 wt % nonionic surfactant (Tween-60), 2 wt % amphoteric surfactant (disodium cocoamphodiacetate (CAD-40)), 0.8 wt % nonionic surfactant, 0.9 wt % solid particles, and balanced water. The pH of the sealant is 11.

Example 15

The sealant composition comprised 48 wt % antifreezing agent (propylene glycol), 19 wt % nature latex, 0.8 wt % nonionic surfactant (Tween-60), 2 wt % amphoteric surfactant (disodium cocoamphodiacetate (CAD-40)), nonionic surfactant, 0.9 wt % solid particles and balanced water. The pH of the sealant is 8.5.

Example 16

The sealant composition comprised 48 wt % antifreezing agent (propylene glycol), 20 wt % nature latex, 1.7 wt % amphoteric surfactant (Sodium Lauroamphoacetate), 0.2 wt % solid particles and balanced water. The pH of the sealant is 10.

Example 17

The sealant composition comprised 48 wt % antifreezing agent (propylene glycol), 19 wt % nature latex, 0.8 wt % nonionic surfactant (Tween-60), 2 wt % amphoteric surfactant (Cocamidopropylamine oxide), nonionic surfactant, 0.9 wt % solid particles and balanced water. The pH of the sealant is 10.

The measurements of the viscosity, the expansion factor and the expansion ratio as well as the seal test of the above Examples have been conducted and the results have been shown in the following Table.

TABLE 1

| Example | Particles Content | Antifreezing Agent | Solvent-Inorganic | Solvent-Organic | Anionic surfactant | Cationic Surfactants | Nonionic surfactants | Amphoteric surfactant | DP-Latex Content |
|---|---|---|---|---|---|---|---|---|---|
| 1 | 0.2 | 48.39 | 30.81 | 0 | 0.1 | 0 | 0 | 0.5 | 20 |
| 2 | 0.5 | 48.39 | 30.81 | 0 | 0.1 | 0 | 0 | 0.5 | 20 |
| 3 | 0.9 | 48.00 | 32.80 | 2.5 | 0 | 0 | 0.8 | 2.0 | 10 |
| 4 | 0.9 | 48.00 | 29.30 | 0 | 0 | 0 | 0.8 | 2.0 | 19 |
| 5 | 0.9 | 48.00 | 28.80 | 0 | 0 | 0 | 1.33 | 2.0 | 19 |
| 6 | 0.9 | 48.00 | 29.22 | 0 | 0 | 0 | 0.88 | 2.0 | 19 |
| 7 | 0.9 | 48.00 | 29.03 | 0 | 0 | 0 | 1.07 | 2.0 | 19 |
| 8 | 0.9 | 48.00 | 29.60 | 0 | 0.1 | 0 | 0.8 | 2 | 19 |
| 9 | 0.6 | 48.00 | 29.30 | 0 | 0 | 0 | 0.8 | 2 | 19 |
| 10 | 0 | 48.00 | 30.02 | 0 | 0 | 0 | 0.8 | 2 | 19 |
| 11 | 0.9 | 48.00 | 26.27 | 2.5 | 0 | 0 | 0.8 | 2 | 19 |
| 12 | 0.9 | 48.00 | 30.90 | 0 | 0 | 0 | 0.8 | 0.4 | 19 |
| 13 | 0.9 | 48.00 | 30.10 | 0 | 0.1 | 0 | 0 | 2 | 19 |
| 14 | 0.9 | 48.00 | 29.30 | 0 | 0 | 0 | 0.8 | 2 | 19 |
| 15 | 0.9 | 48.00 | 29.30 | 0 | 0 | 0 | 0.8 | 2 | 19 |
| 16 | 0 | 48.00 | 30.30 | 0 | 0 | 0 | 0 | 1.7 | 20 |
| 17 | 0.9 | 48.00 | 29.30 | 0 | 0 | 0 | 0.8 | 2 | 19 |

TABLE 1-continued

| | | | Weight percentage | | | |
|---|---|---|---|---|---|---|
| Example | pH | Viscosity (LT) | Viscosity, mPa · s (RT) | Expansion factor ($\alpha$) | Expansion ratio ($\beta$) | Seal Test |
| 1 | 10 | 246.8 | — | >2.0 | >2.0 | Pass |
| 2 | 10 | 276.8 | — | >2.0 | >2.0 | Pass |
| 3 | 10 | — | — | >1.5 | >2.0 | Pass |
| 4 | 10 | 346.0 | — | >2.0 | >2.5 | Pass |
| 5 | 10 | | 41.8 | >2.0 | >2.0 | Pass |
| 6 | 10 | 143 | 38.7 | >3.0 | >3.0 | Pass |
| 7 | 10 | 102.0 | 43.5 | >4.0 | >4.5 | Pass |
| 8 | 10 | 5231 | 52.2 | >5.0 | >5.0 | Pass |
| 9 | 10 | 91.5 | 41.7 | >5.0 | >5.0 | Pass |
| 10 | 10 | 91.4 | 23.1 | >2.5 | >3.0 | Pass |
| 11 | 10 | 118 | 20.0 | >2.5 | >2.5 | Pass |
| 12 | 10 | 522 | 15.6 | >2.0 | >2.0 | Pass |
| 13 | 10 | 865 | 16.0 | >2.0 | >2.0 | Pass |
| 14 | 11 | 263 | 10.2 | >2.0 | >2.0 | Pass |
| 15 | 8.5 | 32.1 | 16.1 | >2.0 | >2.5 | Pass |
| 16 | 10 | 268 | — | >2.0 | >2.5 | Pass |
| 17 | 10 | 227 | 30.5 | >2.0 | >2.5 | Pass |

What we claim:

1. A tire puncture sealant, comprising a rubber latex, an anti-freezing agent, a surfactant and solid particles; wherein the sealant has an expansion ratio of above 200% measured by a blender test according to ASTM D3519-88 and said surfactant has an acetate group or an amine oxide group and said surfactant comprises a zwitterionic surfactant of formula (I) or (II) or (III) shown below:

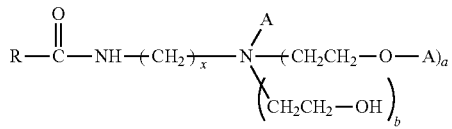

formula (I)

where A is an acetate group:

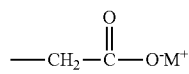

M is monometallic ion, RC=O is C6-C24 acyl or mixtures thereof, x is 0-4, a is 0-1 and b is 0-1, wherein a+b=1;

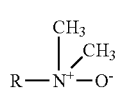

formula (II)

where R is $C_6$-$C_{24}$ alkyl or mixtures thereof;

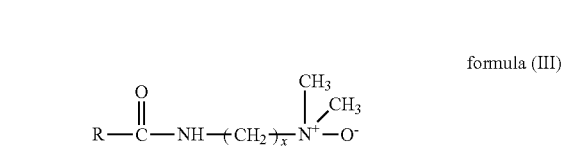

formula (III)

where RC=O is $C_6$-$C_{24}$ acyl or mixtures thereof and x is 0-4.

2. The tire puncture sealant according to claim 1, the tire puncture sealant being capable of expansion by gas introduction during injection of sealant.

3. The tire puncture sealant according to claim 2, wherein the gas comprises any substance presented in gas phase with a density of 0.179-1.2 kg m$^{-3}$ under normal condition.

4. The tire puncture sealant according to claim 2, wherein the injection of sealant comprises a process of placing the tire puncture sealant into a tire by any means with aid of gas flow.

5. The tire puncture sealant according to claim 1, wherein the rubber latex comprises a natural rubber latex and/or a deproteinized natural rubber latex.

6. The tire puncture sealant according to claim 1, wherein the anti-freezing agent comprises at least one selected from the group consisting of an ethylene glycol, a propylene glycol, a 1,3-propanediol, a glycerin and mixtures thereof.

7. The tire puncture sealant according to claim 1, wherein the surfactant is an amphoteric surfactant.

8. The tire puncture sealant according to claim 1, wherein the solid particles comprises a mixture of one or more solid particles having different hydrophobicity or shape.

9. The tire puncture sealant according to claim 1, which has an expansion ratio above 200% measured by a blender test at a temperature −30° C.

10. The tire puncture sealant according to claim 1, wherein the surfactant further comprises at least one selected from the group consisting of non-ionic surfactant, anionic surfactant, and cationic surfactant.

* * * * *